(12) United States Patent
Xu et al.

(10) Patent No.: US 10,034,005 B2
(45) Date of Patent: Jul. 24, 2018

(54) BANDING PREDICTION FOR VIDEO ENCODING

(71) Applicants: Xun Xu, Cupertino, CA (US); Peng Ye, Foster City, CA (US)

(72) Inventors: Xun Xu, Cupertino, CA (US); Peng Ye, Foster City, CA (US)

(73) Assignee: SONY CORPORATION, Tokyo (JP)

( * ) Notice: Subject to any disclaimer, the term of this patent is extended or adjusted under 35 U.S.C. 154(b) by 454 days.

(21) Appl. No.: 14/732,551

(22) Filed: Jun. 5, 2015

(65) Prior Publication Data

US 2016/0360202 A1 Dec. 8, 2016

(51) Int. Cl.
| | |
|---|---|
| *H04N 19/176* | (2014.01) |
| *H04N 19/103* | (2014.01) |
| *H04N 19/117* | (2014.01) |
| *H04N 19/154* | (2014.01) |

(52) U.S. Cl.
CPC ......... *H04N 19/176* (2014.11); *H04N 19/103* (2014.11); *H04N 19/117* (2014.11); *H04N 19/154* (2014.11)

(58) Field of Classification Search
CPC .. H04N 19/176; H04N 19/103; H04N 19/117; H04N 19/154
USPC .................................................. 375/240.04
See application file for complete search history.

(56) References Cited

U.S. PATENT DOCUMENTS

| | | | |
|---|---|---|---|
| 7,668,397 B2 * | 2/2010 | Le Dinh | H04N 17/004 |
| | | | 382/232 |
| 8,731,323 B2 | 5/2014 | Wang | |
| 8,767,822 B2 | 7/2014 | Zuo | |
| 9,232,118 B1 * | 1/2016 | Mogre | H04N 5/21 |
| 2002/0131647 A1 * | 9/2002 | Matthews | H04N 19/86 |
| | | | 382/268 |
| 2005/0100235 A1 * | 5/2005 | Kong | H04N 19/176 |
| | | | 382/261 |
| 2011/0075729 A1 | 3/2011 | Dane | |
| 2013/0128122 A1 * | 5/2013 | Wang | H04N 19/86 |
| | | | 348/607 |
| 2015/0193947 A1 * | 7/2015 | Sharma | G06T 7/0004 |
| | | | 382/264 |

* cited by examiner

*Primary Examiner* — Jamie Atala
*Assistant Examiner* — Ayman Abaza
(74) *Attorney, Agent, or Firm* — Trellis IP Law Group, PC (57) ABSTRACT

A system and method for facilitating inhibiting banding in video data, in part by anticipating when banding may occur given certain encoder parameters. An example method includes receiving an input stream of video data; extracting feature information characterizing the stream of video data; using a feed-forward neural network to process the feature information to estimate when a particular block of the stream of video data will exhibit an artifact when encoded using certain Quantization Parameters (QPs); incorporating the indication into metadata associated with the stream of video data; and transferring the stream of video data and metadata to a video encoder. In a more specific embodiment, the feature information includes color information and texture information, and the neural network includes a feed-forward neural network that includes a classifier with a sigmoid activation function, and which has been trained using a cross-entropy cost function.

4 Claims, 5 Drawing Sheets

BANDING PREDICTION FOR VIDEO ENCODING

BACKGROUND

The present application relates to digital signal processing, and more specifically to systems and method for processing digital data to facilitate avoiding or reducing artifacts that may be introduced when the digital data is compressed, encoded, or otherwise subsequently processed.

Systems for facilitating avoiding, removing, or otherwise detecting artifacts in digitally encoded data are employed in various demanding applications, including video processing, encoding, and quality assessment, audio compression, and so on. Such applications often demand efficient mechanisms for compressing digital data without introducing human perceptible artifacts, such as excessive image banding in video frames.

Efficient mechanisms for avoiding or reducing problematic artifacts introduced in compressed digital data are particularly important in video processing applications, where compression algorithms, such as those employing quantization, often introduces perceptible artifacts, such as excessive banding, which may substantially degrade video appearance.

Generally, video data quantization involves compressing a range of values of transformed image data into discrete quantization levels, where the step size of quantization is specified by the Quantization Parameter (QP) applied to a given block of image pixels occurring in a frame of video.

Compressing information in the video frames through quantization can result in the color banding (also called false contour) artifact, which can be particularly noticeable in areas of a video frame used to represent a color gradient. The width of the resulting color bands may be a function of the QPs used to compress video frames by an encoder.

SUMMARY

An example method facilitates inhibiting banding in video data, e.g., by predicting when certain artifacts will result from certain video encoding or compression. The example method includes receiving an input stream of video data (also simply called video); extracting feature information from the stream of video data, wherein the feature information describes one or more characteristics of the video data; using a neural network to process the feature information to provide an indication of whether a particular block of the stream of video data will exhibit an artifact when encoded with an encoder; incorporating the indication into metadata associated with the stream of video data; and transferring the stream of video data and metadata to a video encoder.

In a more specific embodiment, the feature information includes color information and texture information. The artifact includes a banding artifact, which may otherwise be visible in displayed video data that has been reconstructed (e.g., decoded or decompressed) after having been encoded by the encoder.

In the specific embodiment, the system includes using a feature extractor module to capture the color and texture information of a block (also called a patch) of the video data. A neural network is trained to predict whether a banding artifact will occur when the stream of video data is processed by the video encoder. The neural network may be implemented via a feed-forward neural network that includes a classifier with a sigmoid activation function.

The system may further includes training multiple neural networks for the different Quantization Parameters (QPs) used by the encoder so that one specific neural network will predict whether banding artifact will occur for the video block when the video data is encoded by the encoder.

In the specific embodiment, extraction of (or determination of) the color information includes processing certain coefficients characterizing an image block of the video data. The coefficient processing includes determining an average of one or more channel coefficients for Y, Cb, Cr channels of the image block; calculating a standard deviation of the one or more channel coefficients; calculating a third-order moment of the one or more channel coefficients; and generating a histogram of the one or more channel coefficients, wherein the histogram includes bins for each of the Y, Cb, Cr channels of the image block.

The extraction of (or determination of) texture information involves computing a gradient from a Y channel of the block of video data (which represents an image block or patch of a video frame); including removing speckles and noise from data of the image block by convolving data of the image block with a smoothing filter before computing the gradient; using one filter to compute the first-order derivative in the horizontal direction across the image block; and using a second filter to compute the derivative in the vertical direction across the image block; then using the derivatives in both directions to calculate a two dimensional statistic for each image block.

Hence, certain embodiments discussed herein facilitate predicting whether a banding artifact will occur in reconstructed or decompressed video when certain QPs are used for a given image block during video encoding. A model, implemented in part via a trained feed-forward neural network, enables determining metadata usable by an encoder employing quantization to prevent the artifact through encoder parameter adjustment and/or pre-processing algorithms.

Hence, instead of detecting and removing banding artifact after it occurs, (as is often conventionally done), the banding prediction facilitates or enables proper parameter adjustment and/or applying pre-processing algorithms to eliminate banding artifact in the reconstructed video. By analyzing color information (e.g., exhibited by color features) and texture information (e.g., exhibited by video frame gradient features) as discussed, e.g., in YCbCr color spaces; and by using a feed-forward neural network classifier to classify a block as "banding" or "no banding," video encoding can be readily performed via properly adjusted parameters and/or selectively pre-processing image blocks so that perceptible banding artifacts can be greatly reduced or eliminated in the reconstructed video.

A further understanding of the nature and the advantages of particular embodiments disclosed herein may be realized by reference of the remaining portions of the specification and the attached drawings.

DETAILED DESCRIPTION OF EMBODIMENTS

For the purposes of the present discussion, a Quantization Parameter (QP) may be an integer in a certain range used to determine the quantization step-size of transformed video data.

In block-based video encoding schemes, the QP is often used to regulate the amount of spatial details to be preserved. It determines the number of bits used to encode an image block. When QP is smaller, generally more details are preserved, and the bit rate characterizing the encoded video stream is higher. Similarly, when QP increases, the bit rate drops and fewer details are preserved.

When QP increases, image distortion often increases, while visual quality decreases. Banding (or false contour) artifacts often occur when QP is made large, so as to enable lower bit rates. Banding is often perceived as bands of distinctive colors, where a gradual color transition should otherwise have been observed.

To address banding, post-compression techniques could be employed. Such techniques address defects occurring in video that is reconstructed after having been compressed, where the reconstructed video is analyzed for artifacts (i.e., artifact detection), and then adjustments are made to the reconstructed video to reduce undesirable artifacts. However, this may not be not practical in video encoding, where the regions where banding artifacts will occur must be predicted before the video is compressed, so that encoder parameter adjustment and/or pre-processing algorithms can be applied to prevent the artifact in the first place.

Certain embodiments discussed herein provide a computational model that predicts (i.e., provides an indication as to) whether banding artifact will occur (or will likely occur, based on an implementation specific probability threshold) or not when certain QP values are used by a video encoder to compress a given image block. With reference to the output of the model, proper encoder parameters can be selected, and/or pre-processing algorithms can be applied to avoid or otherwise substantially reduce the banding artifact in reconstructed or decompressed and displayed video.

For clarity, certain well-known components, such as power supplies, decoders, video displays, computer memory, and so on, are not necessarily explicitly called out in the figures. However, those skilled in the art with access to the present teachings will know which components to implement and how to implement them to meet the needs of a given implementation.

Figure 1:
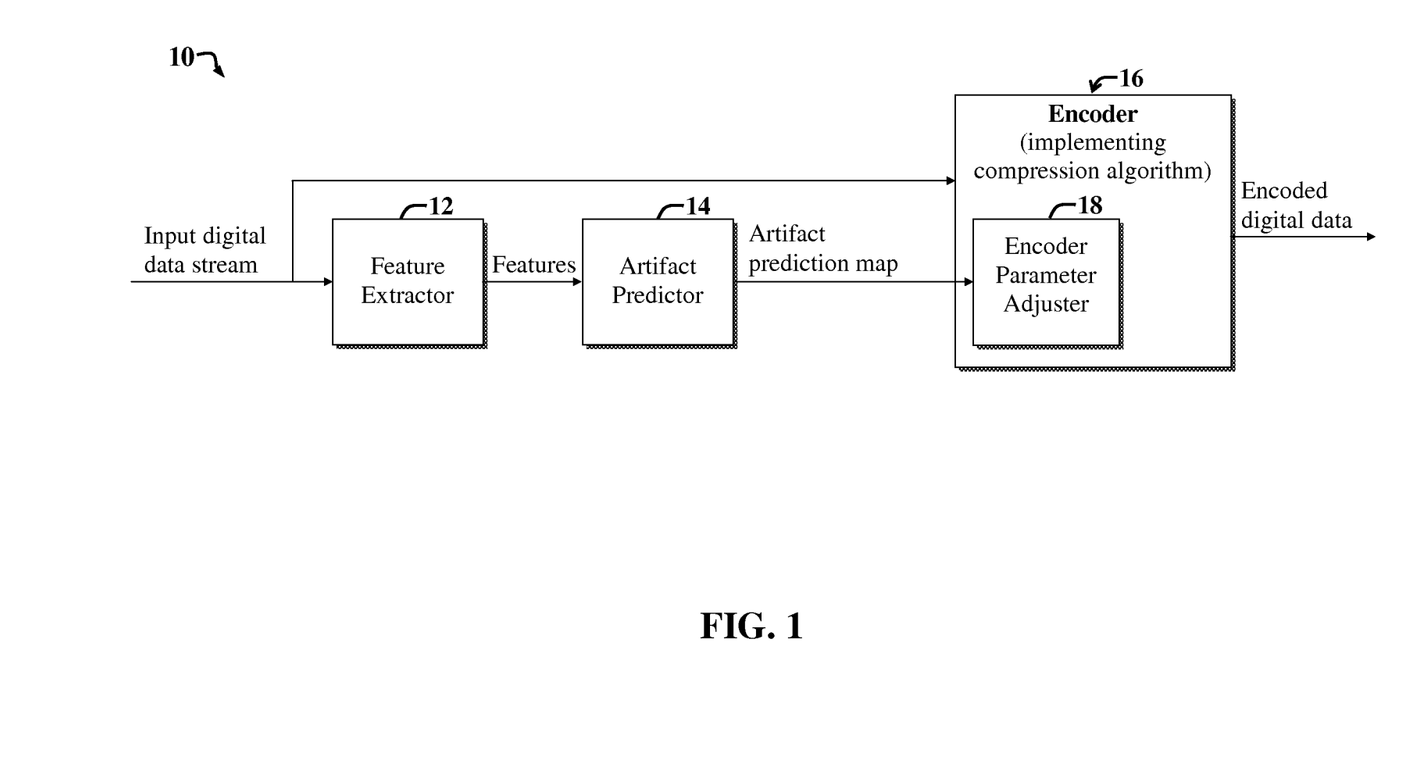
FIG. 1 is a block diagram illustrating a first example system, which is adapted to facilitate avoidance of undesirable artifacts in encoded or compressed digital data based on a prediction of artifacts based on certain encoding parameters.

FIG. 1 is a block diagram illustrating a generalized first example system 10, which is adapted to facilitate avoidance of undesirable artifacts in encoded or compressed digital data based on a prediction of artifacts (e.g., banding artifacts) based on certain encoding parameters (e.g., QPs). The encoding parameters may be adjusted in response to the prediction, as discussed more fully below.

Note that, in general, groupings of various modules of the system 10 are illustrative and may vary, e.g., certain modules may be combined with other modules or implemented inside of other modules, or the modules may otherwise be distributed differently (than shown), without departing from the scope of the present teachings.

The system 10 includes a feature extractor module 12, which receives a stream of uncompressed digital data as input and provides information about features of the digital data as output. An artifact predictor 14 receives feature information from the feature extractor 12 and includes a neural network for employing the feature information to generate metadata (i.e., data about data) characterizing the digital data, as discussed more fully below. The metadata may describe or indicate a prediction as to whether or not a particular artifact will be introduced during encoding when an encoder 16 uses certain encoder parameters (e.g., QPs).

For the purposes of the present discussion, an artifact in digital data, e.g., video data, may be any distortion or perturbation of the digital data that results in human perceptible features in presented media (e.g., imagery, audio, etc.). Digital signal encoders that employ lossy compression may introduce noticeable distortions, i.e., artifacts, due to the discarding of some data during encoding or compression.

A feature of digital data, e.g., digital video data, may be any characteristic or indicator associated with or describing the digital data. Example features include luminance, color gradient or texture, and associated calculations or indicators, e.g., averages, moments, and standard deviations of certain values in the digital data, and so on.

For the purposes of the present discussion, video data may be any information used to display moving or changing visual media, e.g., television, videos, etc. The terms "video data" and "video" may be employed interchangeably herein.

An encoder may be any device or mechanism (e.g., software algorithm) that is adapted to convert input data characterized by first format or coding to output data characterized by a second format or coding. Examples of encoders include compressors for compressing audio or video data, thereby reducing the amount of data representing the audio or video.

In the present example embodiment, the encoder 16 implements a compression algorithm using encoder parameters. The artifact predictor 14 is adapted to generate an artifact prediction map, indicating the likelihood of whether the artifact will occur given use of a particular encoder parameter or range of encoder parameters. The artifact predictor 14 predicts occurrence of a given distortion or artifact in data encoded by the encoder when a particular parameter is used for the encoder 16, the artifact is said to have a high likelihood of occurring in reconstructed, i.e., decompressed and presented media based on data output from the encoder 16.

An encoder parameter adjuster 18 in the encoder 16 is adapted to analyze an artifact prediction map (representing metadata characterizing the input digital data stream) to enable selection of encoder parameters to reduce perceptible artifacts induced during encoding of the input digital data.

Figure 2:
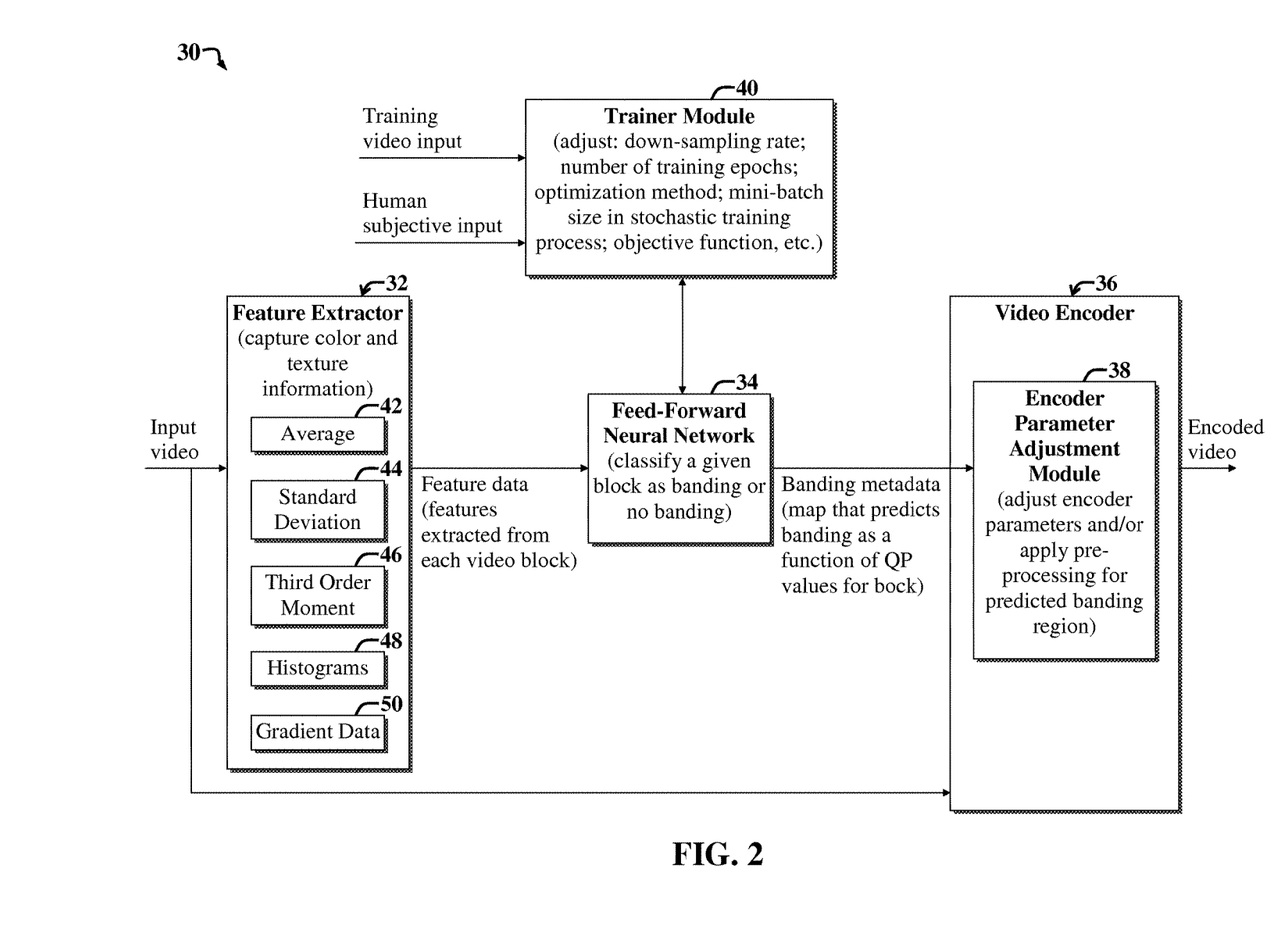
FIG. 2 is a block diagram illustrating a second example system that facilitates predicting banding artifacts in reconstructed video, given certain Quantization Parameters (QPs) used by an encoder and/or compression algorithm, and enabling adjustments to the encoder parameters and/or applying pre-processing to avoid banding artifacts in predicted banding regions.

FIG. 2 is a block diagram illustrating a second example system 30 that is adapted to predict banding artifacts in reconstructed video, given certain QPs used by an encoder and/or compression algorithm, and then enabling adjustments to encoder parameters and/or applying pre-processing algorithms to avoid predicted banding artifacts.

The second example system 30 includes a feature extractor module 32 for extracting feature data from input video data. A feed-forward neural network 34 is adapted to process the feature data to classify each video block (also called video patch, image block, or video frame patch) as "no banding" or "banding" for one or more QPs that may be used by the video encoder.

The example feature extractor module 32 is adapted to capture color and texture information for each block (e.g., a block representing 8×8 pixels of a video frame). The color information may be captured via an average calculation 42, a standard deviation calculation 44, a third order moment calculation 46, and one or more histograms 48. Gradient or texture information is captured via a gradient data calculation 50, as discussed more fully below.

The feed-forward neural network 34 is adapted to output banding metadata as a map (e.g., table or grid) predicting or indicating whether banding is predicted to occur as a function of QPs for each image block of each frame of video data.

An encoder parameter adjustment module 38 in the video encoder 36 is adapted to reference the banding metadata and to then selectively adjust the encoder parameters used to encode the block based on the banding metadata, and/or apply pre-processing to the image block. The resulting encoded video is then less likely to yield banding artifacts when the encoded video is decompressed, i.e., reconstructed and presented on a display.

An example trainer module 40 is adapted to facilitate training of the feed-forward neural network 34. The training involves receiving training video as input in addition to human subjective input indicating whether banding was noticed for different selected QPs. A user interface may be coupled to the trainer module 40 to facilitate adjustments to the network and its training, including adjustments of the encoder down-sampling rate, adjustments to training epochs, adjustments to video optimization methods, adjustments to mini-batch size in a stochastic training process, adjustments to the objective function of the feed-forward neural network 34, and so on.

Those skilled in the art will appreciate that the trainer module 40 may be omitted from the system 30 after the feed-forward neural network 34 is trained. Alternatively, or in addition, the trainer module 40 may be integrated in the feed-forward neural network, which may employ back propagation to minimize an error function, i.e., cost function, also called objective function.

Figure 3:
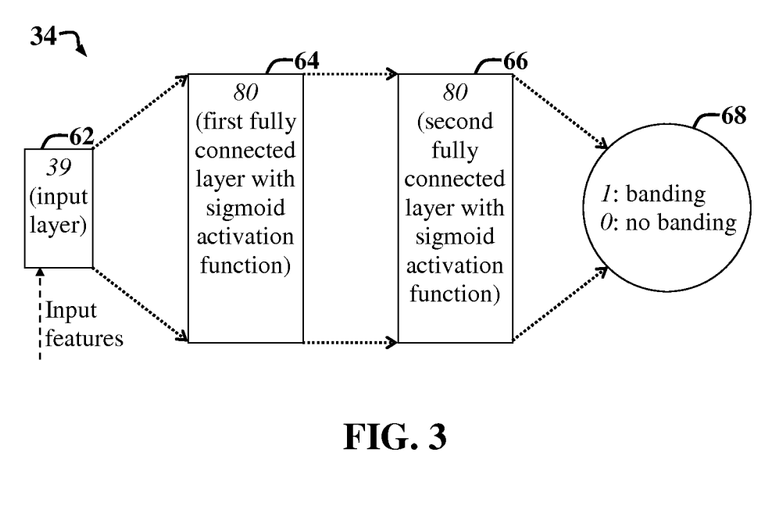
FIG. 3 illustrates an example feed-forward neural network that may be used to implement the feed-forward neural network of FIG. 2.

FIG. 3 illustrates an example feed-forward neural network 34 that may be used to implement the feed-forward neural network of FIG. 2. The example feed-forward neural network 34 includes an input layer with thirty nine input nodes for various input features and fully connected hidden layers 64, 66, with 80 notes each. An output layer 68 facilitates classification of banding (e.g., indicated by a "1") or no banding (e.g., indicated by a "0") for a given QP or a range of QPs for a given image block of a video frame.

For the purposes of the present discussion, a feed-forward neural network may be any neural network with successively arranged nodes or units that are connected in a pattern that lacks cycles. The connection pattern is said to form an acyclic graph.

The example feed-forward neural network 34 exhibits a sigmoid activation function for nodes of each layer, and employs a cross-entropy cost function to generate an error signal to be minimized during training. The exact number of hidden layers; number of hidden nodes in each layer; activation function for each layer, and so on, may be implementation specific and may vary depending upon the needs of a given implementation.

In general, several parameters of the feed-forward neural network 34 may be adjusted, including the network architecture: the number of hidden layers, the number of hidden nodes in each hidden layer, the activation function used in each layer; the training protocol: down-sampling rate, number of training epochs, optimization method, mini batch size in stochastic training process, objective function; and the input features: the number of bins for obtaining Y, Cb, Cr histograms, the distribution of bins, the smoothing kernel applied before computing the gradient, the filters used to compute the gradient.

With reference to FIGS. 2-3, the system 30 of FIG. 2 overcomes limitations of conventional banding prediction and avoidance or correction by employing banding prediction implemented via a neural network classifier 34 that references color and texture features of video data to classify the video data as "banding" or "no banding" for certain QP values.

In the present example embodiment, feature extraction involves extracting features in the YCbCr space, which is often used by video encoding algorithms. Extraction of features in the YCbCr space may reduce overhead that may otherwise be introduced through space transformation. Generally, the present example embodiment uses two groups of video data features, namely, color information and texture information.

Suppose that a B×B image patch, i.e., block of pixel data of a video frame image, is to be processed. The block exhibits vectorized Y, Cb, and Cr channel coefficients, which may be denoted as:

$$I_1(n), I_2(n), \text{and } I_3(n), n=1, \ldots, N; \text{ and } N=B \times B, \quad [1]$$

where each I(n) is scaled to the range of (0,1).

The first set of features captures color information. The first set of features includes an average:

$$f_1(k) = \frac{1}{N} \sum_{i=1}^{N} I_k(i). \quad [2]$$

A standard deviation:

$$f_2(k) = \left( \frac{1}{N-1} \sum_{i=1}^{N} (I_k(i) - f_1(k))^2 \right)^{\frac{1}{2}}. \quad [3]$$

A third-order moment:

$$f_3(k) = \left( \frac{1}{N} \sum_{i=1}^{N} (I_k(i) - f_1(k))^3 \right)^{\frac{1}{3}}. \quad [4]$$

And, histograms of $I_1(n)$, $I_2(n)$, and $I_3(n)$ coefficients. Histograms of these coefficients are not necessarily uniformly distributed in the range of (0, 1). For the Cb channel, a large percentage of the coefficients may lie in the range (0.35, 0.64). For the Cr channel, a large percentage of the coefficients may lie in the range (0.4, 0.64).

If uniformly distributed bins are used, the histogram features corresponding to bins in (0, 0.35) and (0.64, 1) are almost all zeros for samples from both classes. Therefore these features are not discriminant for classifying 'banding' and 'no-banding' blocks.

To avoid generating such uninformative features, bins that are uniformly distributed in the range (0.35, 0.64) for the Cb channel and in the range (0.4, 0.64) for the Cr channel are used. In the present example embodiment, the number of bins used for each channel is eight, yielding a total of twenty four histogram features.

The second set of features is based on the gradient information in the Y channel. The second set of features captures texture information characterizing video data. Before computing the gradient, the image patch is convolved with a smoothing filter (defined as [0.25, 0.25; 0.25, 0.25]) to remove speckles and noise from the image patch, i.e., block.

Then, two filters are used to compute the first order derivative in the horizontal and the vertical directions. In particular, the first filter is characterized by:

$$I_x = Y \otimes \begin{bmatrix} -1 & 0 & 1 \\ -1 & 0 & 1 \\ -1 & 0 & 1 \end{bmatrix}. \quad [5]$$

The second filter is characterized by:

$$I_y = Y \otimes \begin{bmatrix} -1 & -1 & -1 \\ 0 & 0 & 0 \\ -1 & -1 & -1 \end{bmatrix}. \quad [6]$$

The gradient magnitude (G) is defined by:

$$G = \sqrt{I_x^2 + I_y^2}, \quad [7]$$

To capture the smoothness of a block, the following features are computed:

$$f_4(1) = \frac{1}{N} \sum_{i=1}^{N} G(i), \quad [8]$$

$$f_4(2) = \left( \frac{1}{N-1} \sum_{i=1}^{N} (G(i) - f_4(1))^2 \right)^{\frac{1}{2}}, \quad [9]$$

$$f_4(3) = \left( \frac{1}{N} \sum_{i=1}^{N} (G(i) - f_4(i))^3 \right)^{\frac{1}{3}}. \quad [10]$$

To capture the gradient orientation information, statistics of the gradient orientation can be directly computed. However, computationally expensive operators, such as sine, cosine, arctan are often required to compute these statistics.

To avoid such complex computations, the feature extractor 32 may compute the two-dimensional (2D) statistics of $I_x$ and $I_y$ as follows to implicitly capture the gradient information 50, including gradient orientation information:

$$f_5(1) = \frac{1}{N-1} \sum_{i=1}^{N} (I_x - \text{mean}(I_x))^2, \quad [11]$$

$$f_5(2) = \frac{1}{N-1} \sum_{i=1}^{N} (I_y - \text{mean}(I_y))^2, \quad [12]$$

$$f_5(3) = \frac{1}{N-1} \sum_{i=1}^{N} ((I_x - \text{mean}(I_x))(I_y - \text{mean}(I_y))). \quad [13]$$

Regarding the architecture of the feed-forward neural network 34, given the features extracted from each image block, a the feed-forward neural network 34 is trained, e.g., via the training module 40, to learn a classifier that maps a feature vector to a binary value, e.g., 0 or 1, where 0 represents "no banding" and 1 represents "banding."

This represents a 2-class classification problem. Various classifiers can be used, such as Support Vector Machine (SVM), Random Forest (RF) and so on, without departing from the scope of the present teachings. However, in the present example embodiment, the feed-forward neural network 34 is employed.

An overview of the neural network architecture is shown in the diagram of the feed-forward neural network 34 of FIG. 3. This network 34 includes the two hidden layers 64, 66, with eighty hidden nodes in each layer. The activation function used at the two hidden layers is sigmoid function, e.g.:

$$f(x) = \frac{1}{1 + e^{-x}}. \quad [14]$$

Regarding training of the neural network 34, suppose N training samples exist. The feature vector of the n-th training sample is $I_n$, and the ground truth label for $I_n$ is Y. The output of the network for input $I_n$ is $F(I_n; W)$, where W represents parameters in the network. Then the network is trained by minimizing the following objective function (cross-entropy) via back-propagation:

$$L(W) = -\frac{1}{N} \sum_{i=1}^{N} y_n \log(F(I_n; W)) + (1 - y_n) \log(1 - F(I_n; W)). \quad [15]$$

Several different optimization methods can be used for implementing the back-propagation, such as stochastic gradient descent, stochastic L-BFGS (Limited memory Broyden-Fletcher-Goldfarb-Shanno method), etc. For each particular QP, a network is trained for banding prediction.

For small QPs, e.g., QP=8 or 16, banding artifacts rarely occur. This can lead to an imbalanced training step, which includes a large number of negative (no-banding) samples and a very small number of positive (banding) samples. The data imbalance problem brings in difficulty in training.

To overcome this problem, various embodiments may employ a random down-sampling during the training. In each epoch of the training process, a subset of the negative samples is randomly sampled, while all positive training samples are kept. Note that in each epoch, a different subset of negative samples is randomly selected.

In summary, the present example embodiment provides a relatively accurate banding prediction model based on color and gradient features in YCbCr color spaces and use of a feed-forward neural network classifier 34. An accompanying video encoder 36 employs a banding artifact predictor (i.e., parameter adjustment module 38), to guide the adjustment of encoding parameters or the application of pre-processing to each image block so that banding artifact can be greatly reduced in the reconstructed video.

Figure 4:
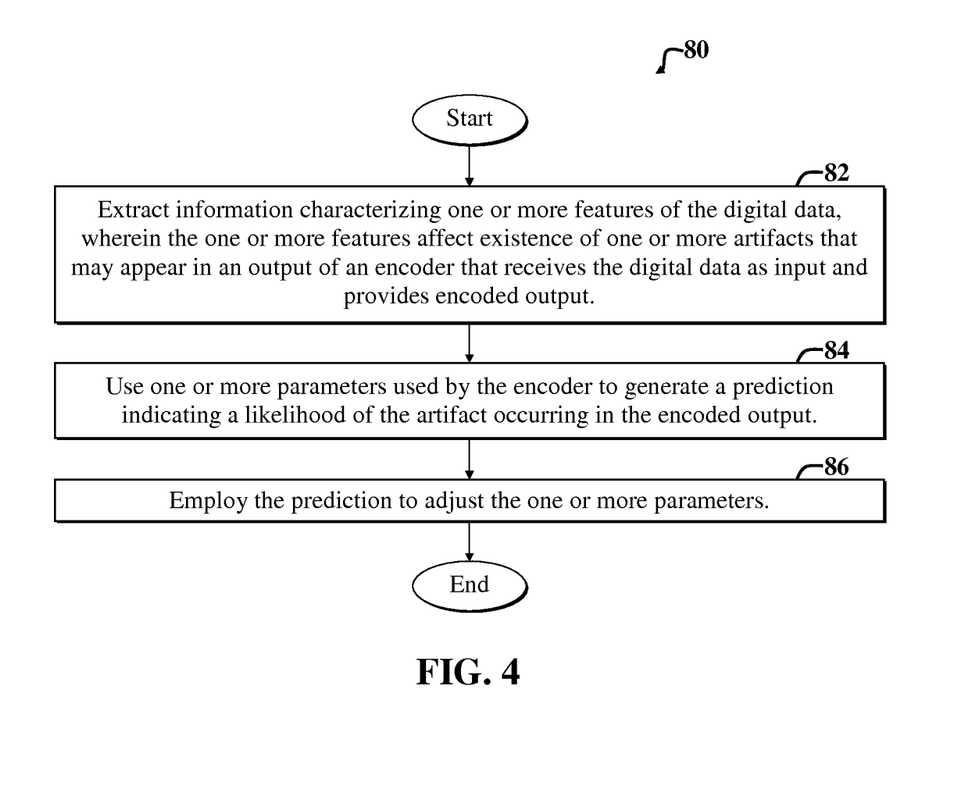
FIG. 4 is a flow diagram of a first example method adapted for use with the embodiments of FIGS. 1-3.

FIG. 4 is a flow diagram of a first example method 80 adapted for use with the embodiments of FIGS. 1-3. The example method 80 is adapted to facilitate predicting an encoding artifact in digital data.

The example method 80 includes an initial feature extraction step 82, which involves extracting information characterizing one or more features of the digital data, the one or more features affecting existence of one or more artifacts that may appear in an output of an encoder that receives the digital data as input and provides encoded output in response thereto.

A subsequent artifact prediction step 84 includes using one or more parameters used by the encoder to generate a prediction indicating a likelihood of the artifact occurring in the encoded output.

Next, a parameter adjustment step 86 includes employing the prediction to adjust the one or more parameters.

Note that the method 80 may be altered, without departing from the scope of the present teachings. For example, the method 80 may be augmented to specify that the digital data includes digital video data, which includes Y, Cb, and Cr channels of data.

The prediction step 84 may include employing a feed-forward neural network to predict or indicate whether certain QPs used to encode video will result in banding artifacts in reconstructed video data, given the information characterizing one or more features, including color information and texture information.

The color information may be captured via Y, Cb, and Cr channel coefficients or calculations based thereon. The texture information may be obtained by determining gradient information in a Y channel of the video data.

Figure 5:
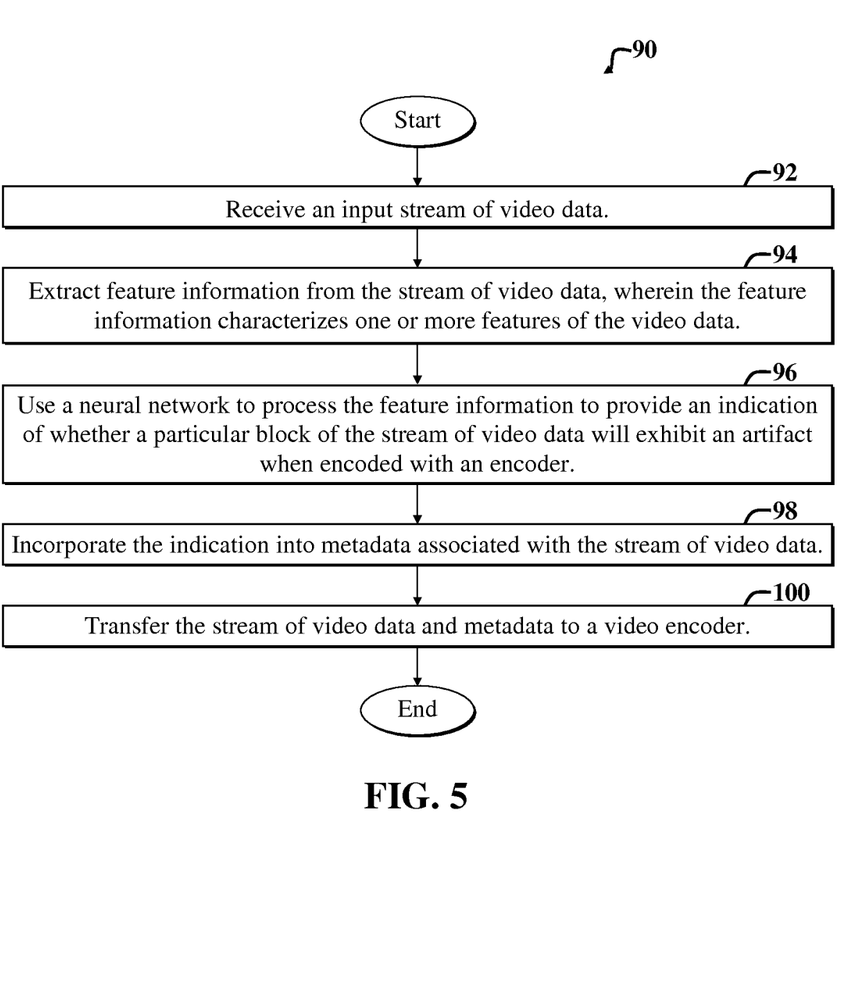
FIG. 5 is a flow diagram of a second example method adapted for use with the embodiments of FIGS. 1-3.

FIG. 5 is a flow diagram of a second example method 90 adapted for use with the embodiments of FIGS. 1-3. The example method 90 is adapted to facilitate inhibiting banding in video data, e.g., by leveraging predictions of banding artifacts given certain features of video data to be encoded or compressed.

The example method 90 includes a first step 92, which involves receiving an input stream of video data.

A second step 94 includes extracting feature information from the stream of video data, wherein the feature information characterizes one or more features of the video data.

A third step 96 includes using a neural network to process the feature information to provide an indication of whether a particular block of the stream of video data will exhibit an artifact when encoded with an encoder.

A fourth step 98 includes incorporating the indication into metadata associated with the stream of video data.

A fifth step 100 includes transferring the stream of video data and metadata to a video encoder.

Note that the method 90 may be altered, without departing from the scope of the present teachings. For example, the method 90 may be augmented to specify that the feature information includes color information and texture information, and to specify that the artifact includes a banding artifact.

The second step 94 may further include using a feature extractor module to capture the color and texture information of a block of the video data.

The third step 96 may further include employing the neural network to predict whether a banding artifact will occur when the stream of video data is processed by a video encoder when the one or more QPs are used for the block. The neural network may be a feed-forward neural network that acts as a classifier that uses a sigmoid activation function.

The fourth step 98 may further include adjusting the one or more QPs so that the neural network will predict that no banding artifact will occur for the video block when the video data is encoded by the encoder.

The second step 94 may further include obtaining the color and texture feature information by processing coefficients characterizing an image block of the video data. The coefficient processing may include determining an average of one or more channel coefficients for Y, Cb, Cr channels of the image block; calculating a standard deviation of the one or more channel coefficients; calculating a third-order moment of the one or more channel coefficients; and generating a histogram of the one or more channel coefficients. This histogram may include bins for each of the Y, Cb, Cr channels of the image block, wherein the histogram includes eight bins per channel.

The example method 90 may further specify that the extraction of color and texture feature information involves computing a gradient from a Y channel of the image block of the video data. Speckles and noise may be removed from data of the image block by convolving data of the image block with a smoothing filter before computing the gradient. The gradient, i.e., texture information, may be computed by using a first filter to compute a derivative in a first direction across the image block and a second filter to compute a derivative in a second direction across the image block; then using the derivative in the first direction and the derivative in the second direction to calculate a two dimensional statistic.

Although the description has been described with respect to particular embodiments thereof, these particular embodiments are merely illustrative, and not restrictive. For example, while various embodiments are discussed with respect to estimating the likelihood if banding artifacts appearing in reconstructed video (that was reconstructed and decompressed after it was encoded or compressed by an encoder) when certain QP values are used by the encoder, embodiments are not limited thereto. For example, various embodiments discussed herein may be adapted to process a different set of features in a different type of data (e.g., audio data) and to predict whether artifacts or other problems may occur in an encoded signal given a predetermined set of encoder parameters, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating inhibiting banding in video data, the method comprising:
    receiving an input stream of video data;
    using a feature extractor module to extract, from the stream of video data, feature information including color information and texture information characterizing one or more features of a block of the video data;
    using a neural network to process the feature information to provide an indication of likelihood of whether the block of the stream of video data will exhibit an artifact including a banding artifact when the block is subsequently encoded using a video encoder;
    incorporating the indication into metadata associated with the stream of video data; and
    transferring the stream of video data and metadata to the video encoder;
    wherein a banding artifact prediction is associated with one or more Quantization Parameters (QPs) associated with the block; and
    wherein using a neural network further includes employing the neural network to predict whether a banding artifact will occur when the stream of video data is processed by the video encoder when the one or more QPs are used for the block.

2. The method of claim 1, wherein the neural network includes a feed-forward neural network.

3. The method of claim 2, wherein the feed-forward neural network includes a classifier with a sigmoid activation function.

4. The method of claim 1, wherein incorporating further includes adjusting one or more encoder parameters and/or applying pre-processing so as to eliminate or reduce the banding artifact for blocks where the neural network predicts the banding artifact to occur otherwise.

* * * * *